March 28, 1950     R. L. DORN     2,502,078
LATHE CONTROL SYSTEM
Filed March 10, 1947     3 Sheets-Sheet 1
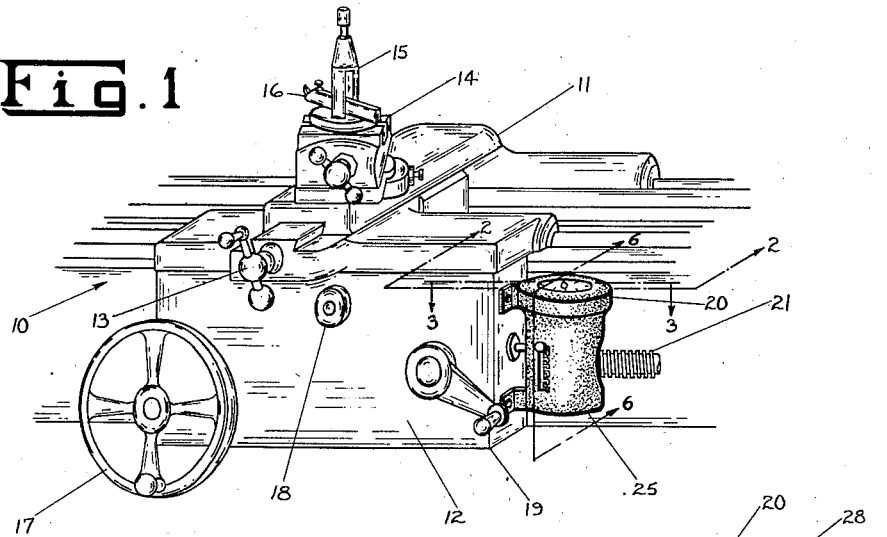
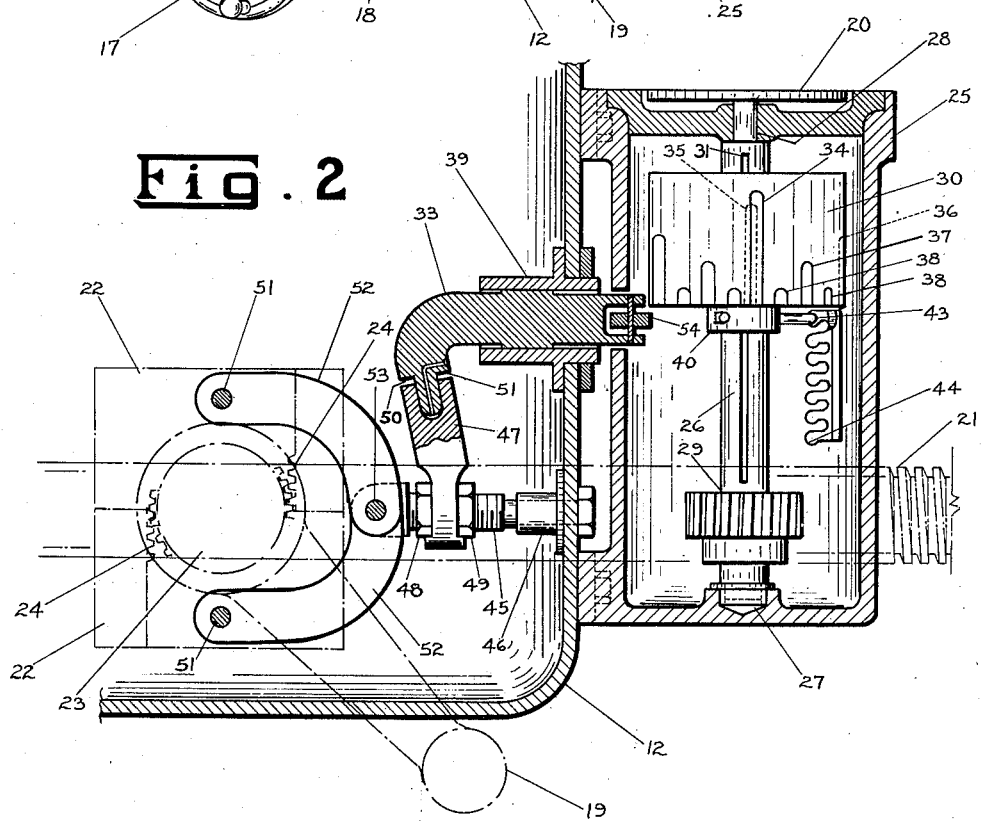
INVENTOR:
ROY L. DORN
BY
ATTORNEYS March 28, 1950   R. L. DORN   2,502,078
LATHE CONTROL SYSTEM
Filed March 10, 1947   3 Sheets-Sheet 2
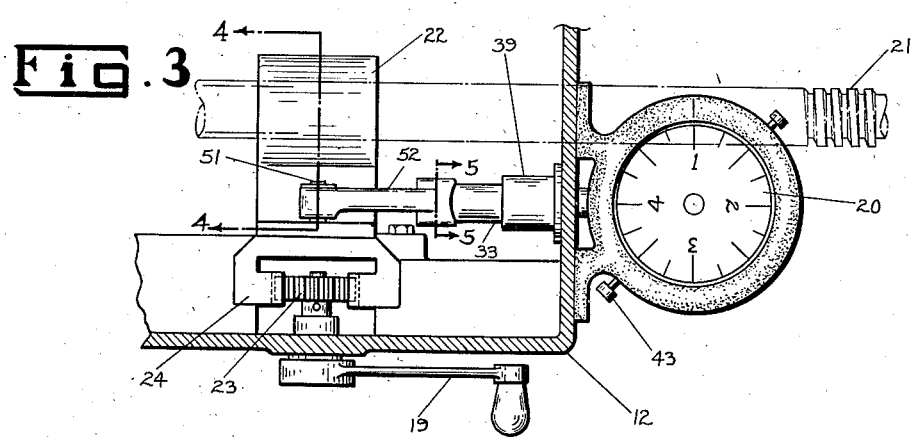
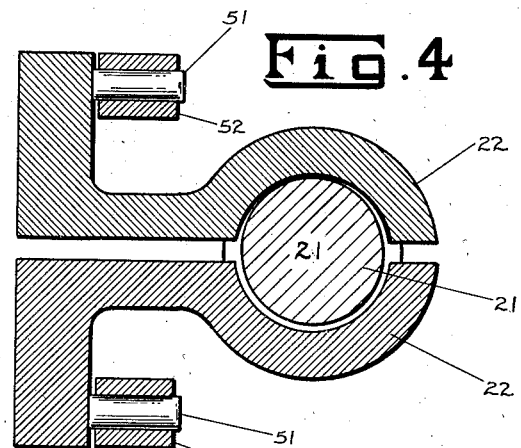
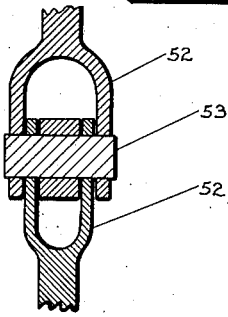
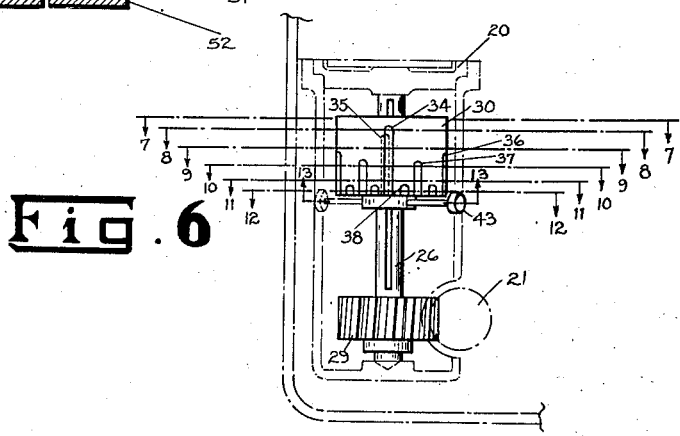
INVENTOR:
ROY L. DORN
BY
ATTORNEYS March 28, 1950     R. L. DORN     2,502,078
LATHE CONTROL SYSTEM
Filed March 10, 1947     3 Sheets-Sheet 3
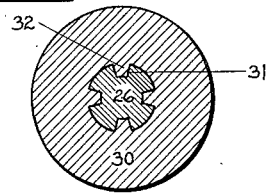
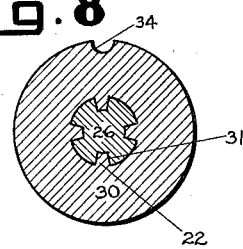
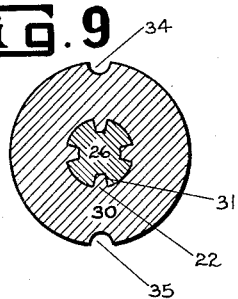
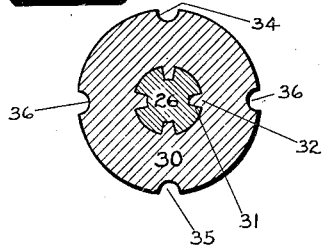
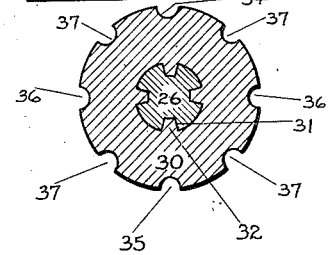
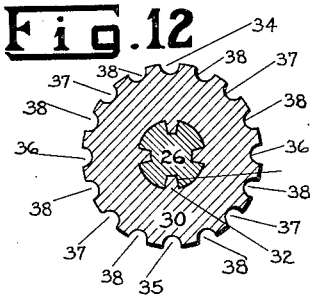
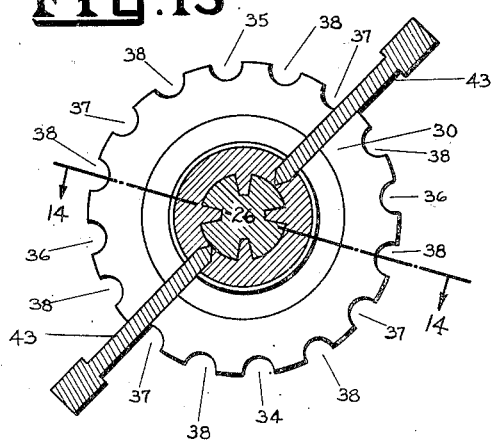
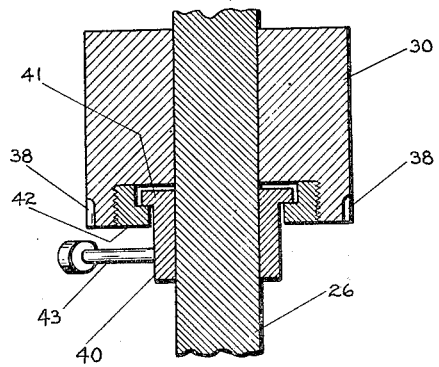
INVENTOR:
ROY L. DORN
BY
ATTORNEYS Patented Mar. 28, 1950

2,502,078

UNITED STATES PATENT OFFICE 2,502,078

LATHE CONTROL SYSTEM

Roy L. Dorn, Riverdale, Calif.

Application March 10, 1947, Serial No. 733,489

3 Claims. (Cl. 82—23)

The present invention relates to improvements in lathe control systems and more particularly to a tactual aid to half-nut operation.

The problems the present invention seeks to overcome are exemplified in the cutting of threads on a lathe requiring re-tracing or chasing the threads several times to achieve sufficient depth. Such cutting is conventionally accomplished by mounting a cutting tool on the lathe carriage in work piece engagement and mechanically motivating the carriage longitudinally of the lathe at a constant speed to trace a helical path on a work piece as it is rotated. Such motivation is generally accomplished by well known half-nut and lead screw engagement. At the end of the cut, the tool is disengaged from the work piece, the half-nuts disengaged from the lead screw and the carriage returned to starting position. To start the re-tracing of the thread, it is essential that the half-nuts be caused to engage the lead screw at the precise points thereon bringing the cutting tool into accurate engagement with the preceding cut on the work piece. Even when assisted by a thread dial indicator, the closing of the half-nuts is accomplished with considerable inaccuracy. Threads are cut painstakingly and frequently imperfectly. Split threads result in waste of time and material. Human error, though reduced by the employing of thread dial indicators, is productive of many objectionable results.

An object of my invention is, therefore, to minimize human error heretofore known in lathe thread cutting.

Another object is to eliminate thread splitting in the cutting of threads by lathes.

Another object is to preclude the closing of lathe half nuts at other than pre-selected positions.

Another object is to supplement visual reference threading dials with correlated means for intermittently and mechanically blocking the half nuts in open position.

Another object is to provide an improved system and apparatus conducive to the cutting of threads in an accurate, dependable, and expeditious manner.

Other objects and advantages will appear from the further description in the specification.

In the drawings:

Fig. 1 is a perspective view of a portion of a lathe illustrative of the employment of the system of the present invention.

Fig. 2 is a section taken on line 2—2 of Fig. 1.

Fig. 3 is a section taken on line 3—3 of Fig. 1.

Fig. 4 is a section taken on line 4—4 of Fig. 3.

Fig. 5 is a somewhat enlarged fragmentary section taken on line 5—5 of Fig. 3.

Fig. 6 is an elevation of a portion of the present invention as viewed from 6—6 in Fig. 1, a segment of the threading dial housing being removed to reveal inner working elements.

Figs. 7 to 12 inclusively are taken on lines 7—7, 8—8, 9—9, 10—10, 11—11, and 12—12 respectively of Fig. 6 to illustrate an appropriate configuration for a pilot or sprag wheel later described.

Fig. 13 shows control means of the present invention as taken on line 13—13 of Fig. 6.

Fig. 14 is a somewhat enlarged section taken on line 14—14 of Fig. 13.

Referring in greater detail to the drawings:

In Fig. 1, a portion of a lathe embodying the present invention is indicated. To facilitate explanation of the invention and to establish its location with reference to conventional lathe elements, attention is appropriately given to well known portions of the lathe. The lathe bed is indicated generally at 10. A carriage 11 having a depending apron 12 is mounted on the lathe bed to slide longitudinally thereof. On the carriage, a conventional cross feed 13, a compound rest 14, a tool post 15 and a cutting tool 16 are indicated. Seen on the apron, are a hand wheel 17, operating a rack pinion to move the carriage back and forth on the lathe bed when the half nuts are open; a clutch knob 18; and a crank lever 19 opening and closing the half nuts within the apron. A thread dial indicator is shown at 20 mounted on the apron, and divided into quadrants numbered from 1 to 4 inclusively. Between the apron and the side of the bed of the lathe is a longitudinally disposed lead screw of the conventional form and function. It is well known in lathe threading operations to impel the carriage longitudinally of the lathe bed by engaging the half-nuts and the lead screw, as the lead screw is rotated in correlation with the rotation of the work piece.

In Fig. 2, the half nuts 22 are shown in engagement with the lead screw 21. The half nuts are opened and closed by a pinion 23 and rack gears 24 formed on the half-nuts and engaged with the pinion. The pinion is motivated by the crank lever 19.

A housing 25 serves to protect the thread dial indicator 20 and motivating means therefore. As the housing is broken away in Fig. 2, said motivating means are clearly indicated. A shaft 26 is journaled in the housing, as at 27 and 28, preferably in an erect position. A pinion gear 29 is mounted on the shaft 26, in engagement with the lead screw 21 shown in Fig. 6. The thread dial indicator 20 is mounted on the upper end portion of the shaft for visual reference. So mounted, it is obvious that rotation is imparted to the thread dial indicator from the lead screw, whenever the carriage 11 is moved other than in accordance with thread travel of the lead screw. That is, when the half nuts 22 are closed and the carriage is caused to travel as normally impelled by the lead screw, the shaft and thread dial indicator are not rotated. Whenever the carriage is moved relative to thread travel of the lead screw, other than in accordance with such normal movement, as for example when the carriage is stationary, the shaft and threading dial are rotated in timed response to such relative movement.

The elements heretofore discussed are well known in lathe structures and are described as cooperative elements with which the present invention is concerned. The utilities of these elements have been in no way impaired by the present invention. The invention may be cooperatively employed with the visual threading dial, providing both visual and tactual aids to half nut control or entirely separately therefrom. The shaft 26 provides a convenient mounting for a pilot or sprag wheel 30, presently more fully described. In describing the present invention in connection with the shaft and pinion gear 29 it is to be borne in mind that in lathes having no thread dial indicator, a similar shaft and pinion gear may be employed as an independent mounting for the sprag wheel.

The sprag wheel 30 is preferably cylindrical in form and is mounted concentrically on the shaft 26 to rotate with the shaft but to slide longitudinally thereof. Such mounting is conveniently accomplished by forming female splines 31 on the shaft and complementary male splines 32 inwardly disposed the circumscribing sprag wheel, said male and female splines being in sliding engagement. The periphery of the sprag wheel has receptacles formed therein to receive a detent member 33, presently more fully described. Suffice it at this point to observe a condition which is subsequently explained, that the half-nuts 22 cannot be closed unless the sprag wheel is positioned to receive the detent member in a receptacle thereof. As seen in Fig. 2 and Figs. 6 to 12 inclusively, the receptacles preferably comprise grooves formed in the sprag wheel longitudinally thereof and of various lengths. Thus by engaging the periphery of the sprag wheel at various longitudinal positions as the sprag wheel is rotated, sets of receptacles are encountered, the individual receptacles of which are equally spaced around the circumference of the sprag wheel. A groove 34 is formed longitudinally in the sprag wheel extending upwardly from the bottom substantially ⅚ of the length thereof. A second groove 35 is formed longitudinally in the sprag wheel oppositely disposed the groove 34 and extending upwardly substantially ⅔ the length of said sprag wheel. A pair of grooves 36 extend upwardly substantially ½ of the length of the sprag wheel and are positioned to bisect the segments thereof delineated by the grooves 34 and 35. Similarly, four grooves 37 are extended upwardly substantially ⅓ the length the sprag wheel to bisect longitudinally the segments previously formed and these bisected segments in turn are bisected by eight grooves 38 extended upwardly substantially ⅙ the length of the sprag wheel. So formed, the detent member may be brought to bear at various levels on the rotating sprag wheel with the following results evident in the figures noted:

| Height Detent Member Engages Sprag Wheel | No. of Receptacles Encountered Each Revolution of the Sprag Wheel | Illustrated In— |
|---|---|---|
| Above ⅚ of its length | None | Fig. 7. |
| Between ⅔ to ⅚ | 1 | Fig. 8. |
| Between ½ to ⅔ | 2 | Fig. 9. |
| Between ⅓ to ½ | 4 | Fig. 10. |
| Between ⅙ to ⅓ | 8 | Fig. 11. |
| Below ⅙ | 16 | Fig. 12. |

The foregoing description of the sprag wheel is illustrative of a suitable form. The present invention is not limited to such form, but may embody sprag wheels of other forms suitable to the purpose.

It has been found convenient to mount the detent member 33 in the housing 25 by means of a slide bearing 39 positioned so that said detent member will impinge on the sprag wheel 30 in substantially radial relation thereto. To bring the detent member to bear on any selected set of receptacles, the sprag wheel is adjustably positioned longitudinally of the shaft 26. This is conveniently accomplished as shown in Figs. 13 and 14. A sleeve 40 is journaled on the shaft 26 and in the sprag wheel 30. A collar 41 is provided at the upper end of the sleeve and the sleeve rotatably associated with the sprag wheel by an annular male nut 42 engaged to the sprag wheel and extended inwardly below the collar circumjacent the sleeve. Shifting arms 43 are screw-threadedly engaged to the sleeve and radially extended therefrom, providing convenient and positive means for elevationally positioning the sprag wheel with reference to the detent member 33. Receivers 44 are provided in the housing and the shifting arms extended therethrough, as seen in Figs. 1 and 2. The receivers are notched to support the shifting arms, and thus the sprag wheel, at elevations selectively bringing the various sets of receptacles into detent member engagement.

Referring again to Fig. 2 and to Figs. 3, 4, and 5, the mechanical linkage between the half-nuts 22 and the detent member 33 is illustrated. A follower 45 is slidably mounted in the apron by means of a slide bearing 46 substantially parallel to the detent member 33. A connecting element 47 transmits reciprocal movement of the follower to corresponding movement on the part of the detent member. Nuts 48 and 49 are screw threadedly engaged to the follower and in abutting relation to the connecting element serve to secure said element in longitudinally adjusted position thereon. The connecting element is preferably articulated, as at 50, to facilitate assembly and to preclude binding of the detent member and follower in their respective slide bearings.

To translate opening and closing of the half-nuts 22 into reciprocal motion of the follower, a stud 51 is provided on each half-nut as indicated in Fig. 4. An arcuate leg 52 is pivotally mounted on each of the studs and both of such arms are pivotally connected to the follower 45 by a pin 53 indicated in Figs. 2 and 5. As the half-nuts are opened, the legs are spread and the follower and detent member are drawn toward the half-nuts. When the crank lever 19 is manipulated to close the halfnuts, the follower and detent member are thrust away from the halfnuts. The adjustment nuts 48 and 49 are so positioned that as long as the detent member rides on the periphery of the sprag wheel the half nuts cannot be closed. To reduce friction of the detent member on the sprag wheel a roller 54 is conveniently provided in the inner end portion thereof. The instant the detent member is received by a receptacle, said detent member and follower move a sufficient distance away from the half-nuts that the legs can pivot inwardly and permit the half-nuts to close. Attention is directed to the fact that at the instant the detent member engages a receptacle in the sprag wheel the half-nuts close in thread chasing relation on the lead screw resulting in movement of the carriage by lead screw motivation and the responsive cessation of rotation of the shaft 26, sprag wheel 30, and thread dial indicator 20.

*Operation*

The operation of the present invention is obvious from the foregoing and is briefly summarized at this point.

The lathe is preconditioned for thread cutting operation as usual. In addition, the shifting arms 43 are emplaced in the proper notches of the receivers 44 to bring the proper set of receptacles of the sprag wheel 30 into the range of the detent member 33. For clarity of illustration, it is assumed that the lead screw 21 is of the conventional eight threads per inch. Further, it is assumed that the pinion gear 29 mounted on the shaft 26 has thirty-two teeth. Thus, the shaft 26, sprag wheel 30, and the thread dial indicator 20 make one complete rotation every four inches of carriage movement relative to thread travel on the lead screw. Under such conditions, when it is desired, for example, to cut eleven and one-half threads per inch on a work piece, it has been well known that the half-nuts should be closed only at positions of the thread dial indicator 180° apart. It is obvious that in re-tracing a 11½ T. P. I. thread, the starting of the retracing one inch from the beginning of the original thread will result in the splitting of the ridge between the 11th and 12th threads. In the retracing of threads of multiples of ½ threads per inch, said retracing may begin at the beginning of the original thread or multiples of two inches therefrom. Thus in starting the retracing of a 11½ T. P. I. thread two inches from the beginning of the original thread the cutting tool will engage the work piece precisely in the 23rd thread. One rotation of the shaft, sprag wheel and thread dial indicator representing four inches of lead screw travel relative to the carriage, only two points in a complete rotation thereof will permit the closing of the half-nuts without damaging the threads being chased. Thus to cut 11½ T. P. I. the set of receptacles indicated in Fig. 9 should be brought into the operational range of the detent member. This is accomplished by positioning the shifting arms in the notches 3rd from the bottom. Other settings and results are indicated in the following chart:

| TPI To Be Cut | Shifting Arm Positions | No. of Half-nut Closing positions Per Each Rotation of the Sprag Wheel. | Type of Sprag Wheel Periphery Engaged. |
|---|---|---|---|
| None | Bottom notch | 0 | See Fig. 7. |
| Fractional Nos. Multiples of ¼. | Second notch | 1 | See Fig. 8. |
| Fractional Nos. Multiples of ½. | Third notch | 2 | See Fig. 9. |
| Even Numbers | Fourth notch | 4 | See Fig. 10. |
| Multiples of 2 | Fifth notch | 8 | See Fig. 11. |
| Multiples of 4 | Sixth notch | 16 | See Fig. 12. |
|  | Seventh notch | Non-Regulated Closing. | No Engagement See Fig. 2. |

Once the lathe is preconditioned for operation in the usual manner and the sprag wheel 30 properly positioned as dictated by the number of threads per inch to be cut, the hand wheel 17 is employed to run the carriage back to the desired beginning of the thread. As such position is approached, pressure is applied to the crank lever 19 to close the half-nuts 22. When the sprag wheel rotates to a position where a receptacle of the selected set of receptacles is juxtaposed the detent member 33, said detent is received by the receptacle and the half-nuts close on the lead screw 21. As previously mentioned, as long as the half-nuts are engaged to the lead screw, as during the actual thread cutting, the shaft 26 does not rotate. At the end of the thread, the half nuts are opened, disengaging the detent member from the receptacle, and the carriage is manually returned by rotating the hand wheel. Again the sprag wheel operates to preclude the closing of the half nuts at all positions that would result in thread damage.

The synchronization of lead screw rotation with the turning of a work piece, as well as the rotation of the shaft 26 in response to relative carriage and lead screw movement, enables the chasing of a thread being cut as many times as desired, with complete safety and accuracy. Successive cutting passes can be made on the work piece without any required observation of the thread dial indicator. Human error resulting in the closing of the half-nuts at wrong places is eliminated. Savings in time and material are made possible. The lathe operator is relieved of much tedious dial observation and resulting fatigue. The tactual control system of the present invention may be employed with or without thread dial indicators, as desired.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. In combination with a lathe having a movable carriage, a lead screw, and half-nuts borne by the carriage engageable with the lead screw to motivate the carriage; a control apparatus comprising a detent member slidably mounted in the carriage; pivotally associated leg elements each pivotally connected to a half-nut and translating opening and closing of the half-nuts into positive retraction and extension of the detent member; a shaft journaled in the carriage; a sprag wheel splined on the shaft to turn therewith and to slide longitudinally thereof, said sprag wheel being positioned so that the periphery thereof is abutted by the detent member and having formed in said periphery circumscribing sets of longitudinally related detent receptacles adapted to receive the detent member when juxtaposed thereto; control means selectively positioning the sprag wheel on the shaft to bring the detent member to bear on the various sets of receptacles; and means engaged with the lead screw and secured to the shaft driving the shaft in response to relative movement of the carriage and lead screw.

2. In combination with a lathe having a movable carriage, a lead screw, and half-nuts borne by the carriage engageable with the lead screw to motivate the carriage, a shaft borne by the carriage and rotated by the lead screw upon movement of the carriage longitudinally thereof other than in accordance with thread travel on the lead screw; a sprag wheel having receptacles formed in the periphery thereof spline mounted on the shaft to rotate with the shaft; a detent member mounted in the carriage for axial movement in radial relation to the sprag wheel; and means individually interconnecting the half-nuts and the detent member and positively reciprocating the detent member in response to opening and closing of the half-nuts, said detent member precluding the closing of the half-nuts when abutting the periphery of the sprag wheel and allowing the closing thereof when received by a receptacle of the sprag wheel.

3. In combination with a lathe having a movable carriage, a lead screw, and half-nuts borne by the carriage engageable with the lead screw to motivate the carriage, said half-nuts being constrained to movement radially of the lead screw in lead screw engaging and disengaging operations; a control apparatus comprising a detent member slidably mounted for axial movement in the carriage in substantially right angular relation to the line of movement of the half-nuts; a pair of leg elements each pivotally connected to a half-nut and to the detent member whereby movement of the half-nuts radially of the lead screw positively axially reciprocates the detent member and constrains said detent member against rotation; a roller mounted for rotation on the detent member; a shaft journaled in the carriage; a substantially cylindrical sprag wheel splined on the shaft to turn therewith and to slide longitudinally thereof, said sprag wheel being positioned so that the periphery thereof is abutted by the roller on the detent member and axially parallel to said roller and having formed in said periphery circumscribing sets of longitudinally related detent receptacles adapted to receive the detent member when disposed theretoward; control means selectively positioning the sprag wheel on the shaft to bring the detent member to bear on the various sets of receptacles; and means engaging with the lead screw and the shaft driving the shaft in response to relative movement of the carriage and lead screw.

ROY L. DORN.

REFERENCES CITED

The following references are of record in the file of this patent:

UNITED STATES PATENTS

| Number | Name | Date |
| --- | --- | --- |
| 1,067,140 | Schellenbach | July 8, 1913 |
| 2,286,715 | Cheever | June 16, 1942 |
| 2,325,733 | Bickel | Aug. 3, 1943 |

FOREIGN PATENTS

| Number | Country | Date |
| --- | --- | --- |
| 22,464 | Great Britain | 1911 |